(12) United States Patent
Ike

(10) Patent No.: US 10,106,133 B2
(45) Date of Patent: Oct. 23, 2018

(54) BRAKE APPARATUS

(71) Applicant: TOYOTA JIDOSHA KABUSHIKI KAISHA, Toyota-shi (JP)

(72) Inventor: Wataru Ike, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/026,337

(22) PCT Filed: Oct. 20, 2014

(86) PCT No.: PCT/JP2014/078425
§ 371 (c)(1),
(2) Date: Mar. 31, 2016

(87) PCT Pub. No.: WO2015/060453
PCT Pub. Date: Apr. 30, 2015

(65) Prior Publication Data
US 2016/0244036 A1 Aug. 25, 2016

(30) Foreign Application Priority Data

Oct. 24, 2013 (JP) .................................. 2013-221446

(51) Int. Cl.
*B60T 7/22* (2006.01)
*B60T 8/32* (2006.01)

(52) U.S. Cl.
CPC .............. *B60T 7/22* (2013.01); *B60T 8/3275* (2013.01); *B60T 2201/022* (2013.01); *B60T 2201/03* (2013.01)

(58) Field of Classification Search
CPC ...... B60T 7/22; B60T 8/3275; B60T 8/17558; B60T 2201/022; B60T 2201/03; B60W 30/09
See application file for complete search history.

(56) References Cited

U.S. PATENT DOCUMENTS 6,131,063 A * 10/2000 Seki ...................... B60T 8/3275
340/575
2013/0297168 A1* 11/2013 Svensson .............. B60T 8/1755
701/70

FOREIGN PATENT DOCUMENTS

DE 102012207264 B3 * 9/2013 ............ B60T 8/1755
JP 8-34326 A 2/1996
(Continued)

OTHER PUBLICATIONS

International Search Report and Written Opinion dated Sep. 2, 2015 in PCT/JP14/078425 Filed Oct. 20, 2014.

*Primary Examiner* — Jelani A Smith
*Assistant Examiner* — Kelly D Williams
(74) *Attorney, Agent, or Firm* — Oblon, McClelland, Maier & Neustadt, L.L.P.

(57) ABSTRACT

A brake apparatus is configured to execute a brake assist based on a collision risk representing a risk of a vehicle including the brake apparatus to collide with an obstacle, and an emergency operation level representing an emergency level of a brake operation by a driver. The brake apparatus includes a collision risk calculation unit configured to calculate the collision risk, a detection unit configured to detect the emergency operation level, a storage unit configured to store the emergency operation level detected by the detection unit when the collision risk is within a predetermined range, a threshold determination unit configured to determine a threshold for the emergency operation level based on the collision risk, and a brake assist unit configured to execute the brake assist based on a comparison between the emergency operation level stored by the storage unit and the threshold for the emergency operation level.

14 Claims, 4 Drawing Sheets

(56) References Cited

FOREIGN PATENT DOCUMENTS

| JP | 10-71945 A | 3/1998 |
|----|------------|--------|
| JP | 2000-118368 A | 4/2000 |
| JP | 2005-225447 A | 8/2005 |

* cited by examiner

|  | THRESHOLD FOR BRAKE OPERATION AMOUNT (ThPMC) | THRESHOLD FOR BRAKE OPERATION SPEED (ThdPMC) |
|---|---|---|
| LEVEL 1 | 8 | 4 |
| LEVEL 2-H | 4 | 2 |
| LEVEL 2-L | 2 | 1 |
| LEVEL 3 | 1 | 0 |

(b)

|  | ASSIST AMOUNT |
|---|---|
| LEVEL 1 | 1 |
| LEVEL 2 | 2 |
| LEVEL 3 | 6 |
| LEVEL 4 | 10 |

BRAKE APPARATUS

TECHNICAL FIELD

The present invention relates to a brake apparatus to avoid a collision with an obstacle.

BACKGROUND ART

Conventionally, a technology has been known that detects an emergency brake operation by a stepping amount and a stepping speed of a brake, and lowers a detection reference (threshold) for the emergency brake operation in a brake apparatus to execute a brake assist while a risk becomes higher for a collision between the brake-operated vehicle and an obstacle (for example, Patent Document 1). This makes it possible, in an emergency where the risk is high for the vehicle to collide with the obstacle, to execute the brake assist for avoiding the collision with the obstacle even if a stepping on the brake pedal is shallow due to a judgment error or a skill problem of a driver.

RELATED-ART DOCUMENTS

Patent Documents

[Patent Document 1]
Japanese Laid-open Patent Publication No. 2005-225447

SUMMARY OF THE INVENTION

Problem to be Solved by Invention

However, the emergency brake operation by the driver may not be executed appropriately, and even if the detection reference is lowered, there may be cases where the emergency brake operation may not be detected depending on a stepping amount and a stepping speed of the brake pedal at relevant timings. For example, there is a case where a driver steps on the brake comparatively weakly due to a judgment error at a moment when the risk of a collision with an obstacle is comparatively low, and then, makes an additional brake operation for correcting the judgment error when the risk gets higher. In this case, the stepping speed of the additional brake operation may be less than the lowered detection reference (threshold), and hence, there are cases where an effective brake assist cannot be executed even if the detection reference of the emergency brake operation is lowered for assisting the brake operation.

Thereupon, in view of the above, it is an object of the present invention to provide a brake apparatus that can execute an effective brake assist even if a driver does not perform an appropriate brake operation due to a judgment error or the like.

Means to Solve the Problem

According to at least one embodiment of the present invention, a brake apparatus configured to execute a brake assist based on a collision risk representing a risk of a vehicle including the brake apparatus to collide with an obstacle, and an emergency operation level representing an emergency level of a brake operation by a driver, includes a collision risk calculation unit configured to calculate the collision risk; a detection unit configured to detect the emergency operation level; a storage unit configured to store the emergency operation level detected by the detection unit when the collision risk is within a predetermined range; a threshold determination unit configured to determine a threshold for the emergency operation level based on the collision risk; and a brake assist unit configured to execute the brake assist based on a comparison between the emergency operation level stored by the storage unit and the threshold for the emergency operation level.

Advantage of the Invention

According to at least one embodiment of the present invention, it is possible to provide a brake apparatus that can execute an effective brake assist even if a driver does not perform an appropriate brake operation due to a judgment error or the like.

BRIEF DESCRIPTION OF DRAWINGS

FIG. 4 is a schematic view illustrating an example of thresholds (ThPMC and ThdPMC) and assist amounts for executing a brake assist.

MODE FOR CARRYING OUT THE INVENTION

In the following, embodiments of the present invention will be described with reference to the drawings.

Figure 1:
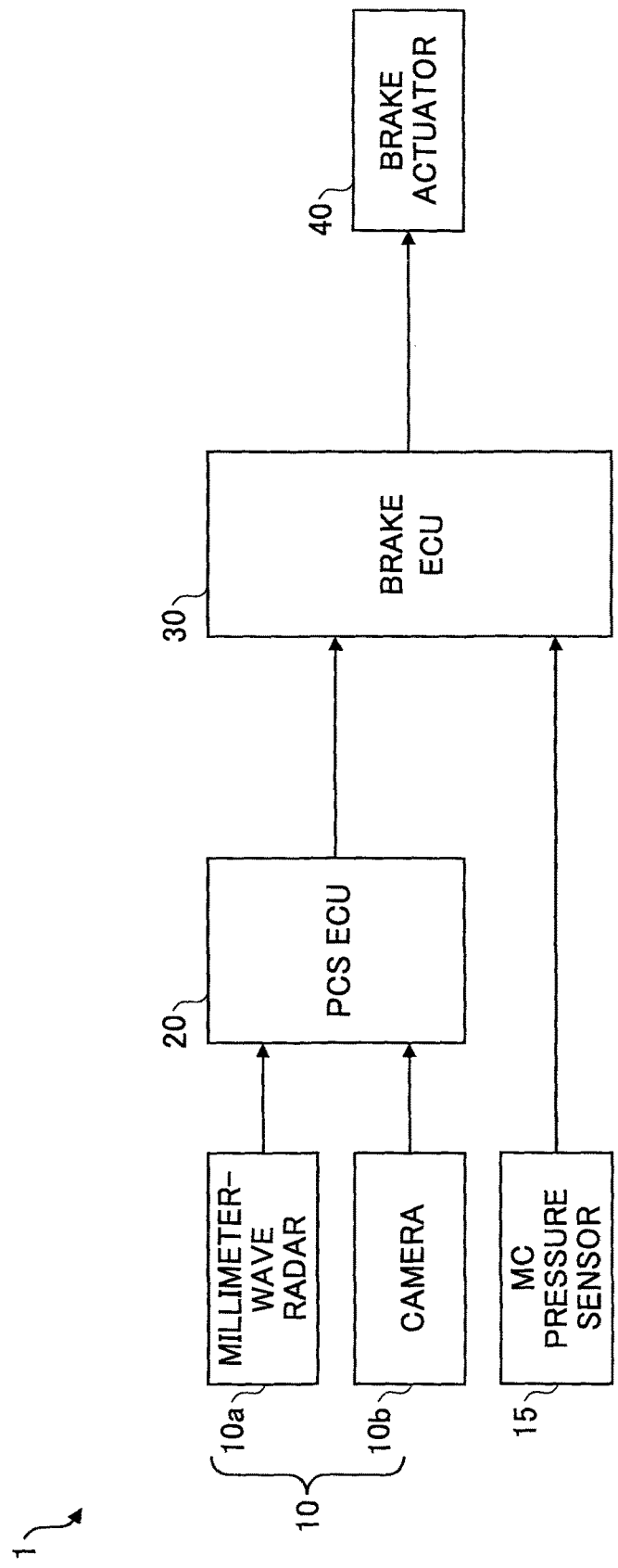
FIG. 1 is a block diagram illustrating an example of a configuration of a brake apparatus.

FIG. 1 is a block diagram illustrating an example of a configuration of a brake apparatus 1 according to the present embodiment.

The brake apparatus 1 in the present embodiment is built in a vehicle, and executes a brake assist by an intervention to avoid a collision of the vehicle with an obstacle. Note that the vehicle is an arbitrary vehicle, which may be a vehicle having an engine as the source of the driving force, may be a hybrid vehicle, or may be an electric vehicle having a motor as the only source of the driving force.

The brake apparatus 1 includes an obstacle detection unit 10, a master cylinder pressure (referred to as "MC pressure" below) sensor 15, a PCS (Pre-Crash Safety) ECU 20, a brake ECU 30, and a brake actuator 40.

The obstacle detection unit 10 is a unit to detect obstacles (including other vehicles) in the surroundings including the front of the vehicle, and may include a millimeter-wave radar 10a and a camera 10b. Note that although the millimeter-wave radar 10a and the camera 10b are provided as the obstacle detection unit 10 in the present embodiment, detection of obstacles may be executed only by the millimeter-wave radar 10a. Also, instead of the millimeter-wave radar 10a, a laser radar or the like may be used.

The millimeter-wave radar 10a is built in the vehicle, for example, around the center in the width direction (left and right direction) at the front bumper or in the front grill. The millimeter-wave radar 10a transmits forward a radio wave in a millimeter wave band (for example, 60 GHz) to be reflected by an obstacle, and receives the reflected wave to detect the obstacle, with which the distance to the obstacle, the relative speed, and the orientation can be detected. Specifically, it may detect the distance between the vehicle and the obstacle based on a time difference (frequency difference) between the transmitted radio wave and the received reflected wave, and it may use the Doppler effect for detecting the relative speed between the vehicle and the obstacle based on change of the frequency between the transmitted radio wave and the received reflected wave. Also, the millimeter-wave radar 10a may include multiple antennas (for example, five) to receive reflected waves from the obstacle for detecting the orientation of the obstacle relative to the vehicle by phase differences (received time differences) of the reflected waves from the obstacle received by the multiple antennas. The millimeter-wave radar 10a outputs detected information (obstacle information) about the distance, relative speed, and orientation of the obstacle to the PCS ECU 20.

The camera 10b is an image capturing unit to capture an image of the surroundings including the front of the vehicle. Based on an image captured by the camera 10b, the distance to the obstacle can be detected. Note that a processing unit, which executes a calculation process for deriving the distance from the obstacle in the image based on the image captured by the camera 10b, may be included in the camera 10b itself or may be included in the PCS ECU 20 that can receive the image from the camera 10b. The camera 10b outputs information (obstacle information) about the distance to the detected obstacle to the PCS ECU 20.

The MC pressure sensor 15 is a detection unit to detect a brake operation amount (amount of a stepping operation of a brake pedal) and a brake operation speed (speed of the stepping operation of the brake pedal) by a driver. The master cylinder pressure is generated proportionate to the brake operation amount (brake pedaling force) by the driver, and it is possible to detect the brake operation amount by detecting the master cylinder pressure. Also, it is possible to detect the brake operation speed by the differential value of the master cylinder pressure. Note that the brake operation amount of the driver may be detected, for example, by a different unit such as a brake stroke sensor disposed at the brake pedal, and the brake operation speed may be detected by the differential value of the brake operation amount detected by the brake stroke sensor. The MC pressure sensor 15 outputs information about the MC pressure to the brake ECU 30.

Both the PCS ECU 20 and the brake ECU 30 are configured with microcomputers that include, for example, CPUs to execute calculation processes, ROMs to store control programs, readable/writable RAMs to store calculation results and the like, timers, counters, input interfaces, and output interfaces. Note that functions of the PCS ECU 20 and the brake ECU 30 may be discretionarily implemented by hardware, software, firmware or a combination of these. For example, an arbitrary part of or all of the functions of the PCS ECU 20 and the brake ECU 30 may be implemented by an ASIC (Application-Specific Integrated Circuit) or an FPGA (Field Programmable Gate Array) for specific usage. Also, a part of or all of the functions of the PCS ECU 20 and the brake ECU 30 may be implemented by another ECU. Also, the PCS ECU 20 and the brake ECU 30 may implement a part of or all of functions of the other ECU. For example, a part of or all of the functions of the PCS ECU 20 may be implemented by the brake ECU 30, and a part of or all of the functions of the brake ECU 30 may be implemented by the PCS ECU 20.

By loading and executing various programs stored in the ROM on the CPU, the PCS ECU 20 can execute processes including calculation of TTC, setting of a PBA flag, or a request to the brake ECU or a meter ECU (not shown), which will be described later. Also, the PCS ECU 20 is connected with the obstacle detection unit 10 (millimeter-wave radar 10a and camera 10b) and the brake ECU 30 to communicate with each other by, for example, an on-board LAN such as a CAN (Controller Area Network), a direct connection line, or the like.

The PCS ECU 20 receives the obstacle information output from the millimeter-wave radar 10a and the camera 10b, and obtains the distance, relative speed, orientation, and the like of the obstacle in the surroundings of the vehicle. Then, based on the distance, relative speed, orientation, and the like, it calculates a TTC (Time-To-Collision, or a delay margin for a collision). The TTC is defined by dividing the distance from the obstacle by the relative speed, which is a parameter that represents time to a collision with the obstacle at a certain moment. Also, the TTC can be considered as a collision risk representing a risk of collision with the obstacle because the shorter the TTC is, the greater the risk of the collision with the obstacle becomes. Note that as the distance from the obstacle used for calculating the TTC, the distance detected by the millimeter-wave radar 10a may be used, or the average of the distance detected by the millimeter-wave radar 10a and the distance detected by the camera 10b may be used. Also, as for the distance from the obstacle and the relative speed used for calculating the TTC, the information about the orientation of the obstacle by the millimeter-wave radar 10a may be used that is corrected for the distance and the relative speed in the running direction of the vehicle.

Also, the PCS ECU 20 sets a PBA (Pre-crash Brake Assist) flag that represents a level of the collision risk depending on a calculated TTC. The PBA flag may be set to, for example, one of four levels of 0 to 3 where each level is assigned a predetermined TTC range. For example, assuming that the level of a collision risk gets higher from 0 to 3, the PBA flag 0 is assigned TTC$\geq$A1[s]; the PBA flag 1 is assigned A2[s]$\leq$TTC<A1[s]; the PBA flag 2 is assigned A3[s]$\leq$TTC<A2[s]; and the PBA flag 3 is assigned TTC<A3[s], where 0<A3<A2<A1. The PCS ECU 20 outputs a request for a brake assist to the brake ECU 30 depending on the set PBA flag. For example, in case of the PBA flag 0, it may be taken as the likelihood of the collision is low, with which a brake assist is not executed by the brake ECU 30 as will be described later, and in cases of the PBA flag 1-3, the brake assist may be executed. Then, for the PBA flag 1-3, it outputs a request for a brake assist to the brake ECU 30. It also outputs the PBA flag that has been set depending on the calculated TTC to the brake ECU 30.

Also, the PCS ECU 20 may execute a drive assist via the meter ECU (not shown) and the like in accordance with the set PBA flag. The meter ECU may be connected with a combination meter device (not shown) to make an indication to a driver by displaying, and/or an indicator sound generation device (not shown) to make an indication to a driver by sound. In response to a request from the PCS ECU 20, the meter ECU may control to display numbers, characters, figures, an indicator lamp, and the like on the combination meter device, and may control to indicate an alarm sound and an alarm voice on the indicator sound generation device. For example, when the PBA flag is within 1-3, the PCS ECU 20 may request to the meter ECU for outputting the alarm sound or lighting the indicator lamp to indicate to the driver that there is a likelihood of a collision.

By loading and executing various programs stored in the ROM on the CPU, the brake ECU 30 can execute various processes relating to a brake assist as will be described later. Also, the brake ECU 30 is connected with the MC pressure sensor 15, the PCS ECU 20, and the brake actuator 40 to communicate with each other by, for example, an on-board LAN such as a CAN (Controller Area Network), a direct connection line, or the like.

The brake ECU 30 is to execute brake control of the vehicle, and controls, for example, the brake actuator 40 that makes hydraulic brake devices disposed at respective wheels operate. The brake ECU 30 controls the output (wheel cylinder pressures) of the brake actuator 40 to execute a brake assist, based on information about the MC pressure received from the MC pressure sensor 15 as a brake operation amount by the driver and a request from the PCS ECU 20. Specifically, it determines whether to execute a brake assist based on the brake operation amount based on the MC pressure information, the brake operation speed representing an emergency operation level of the brake, and the request from the PCS ECU 20. More specifically, if the PBA flag is within a predetermined range (range of 1 to 3), namely, if the risk of collision with an obstacle is greater than or equal to the predetermined level, and if it can determine that an emergency operation of the brake has been made based on the brake operation amount and the brake operation speed, it executes the brake assist. When executing the brake assist, it may generate an assist pressure by an intervention in addition to the MC pressure generated with the brake operation by the driver, to output a wheel cylinder pressure that adds the MC pressure with the assist pressure. A concrete method of determining whether to execute a brake assist and a method of determining a brake assist amount will be described later. Note that, for a hybrid vehicle or an electric vehicle, based on a request from the PCS ECU 20, a brake assist may be executed by having a motor output (regenerative operation) controlled.

The brake actuator 40 may include a pump to generate a high-pressure oil (and a motor to drive the pump), various valves, and a hydraulic circuit. Also, the hydraulic circuit can be configured discretionarily as long as it is configured so that the wheel cylinder pressures can be raised independently of a stepping amount of the brake pedal by the driver, and may typically include a high-pressure hydraulic source (a pump and an accumulator to generate a high-pressure oil) other than a master cylinder. Also, a circuit configuration typically used in a brake-by-wire system may be adopted, which is represented by an ECB (Electric Control Braking system).

Next, concrete brake assist operations by the brake apparatus 1 will be described.

Figure 2:
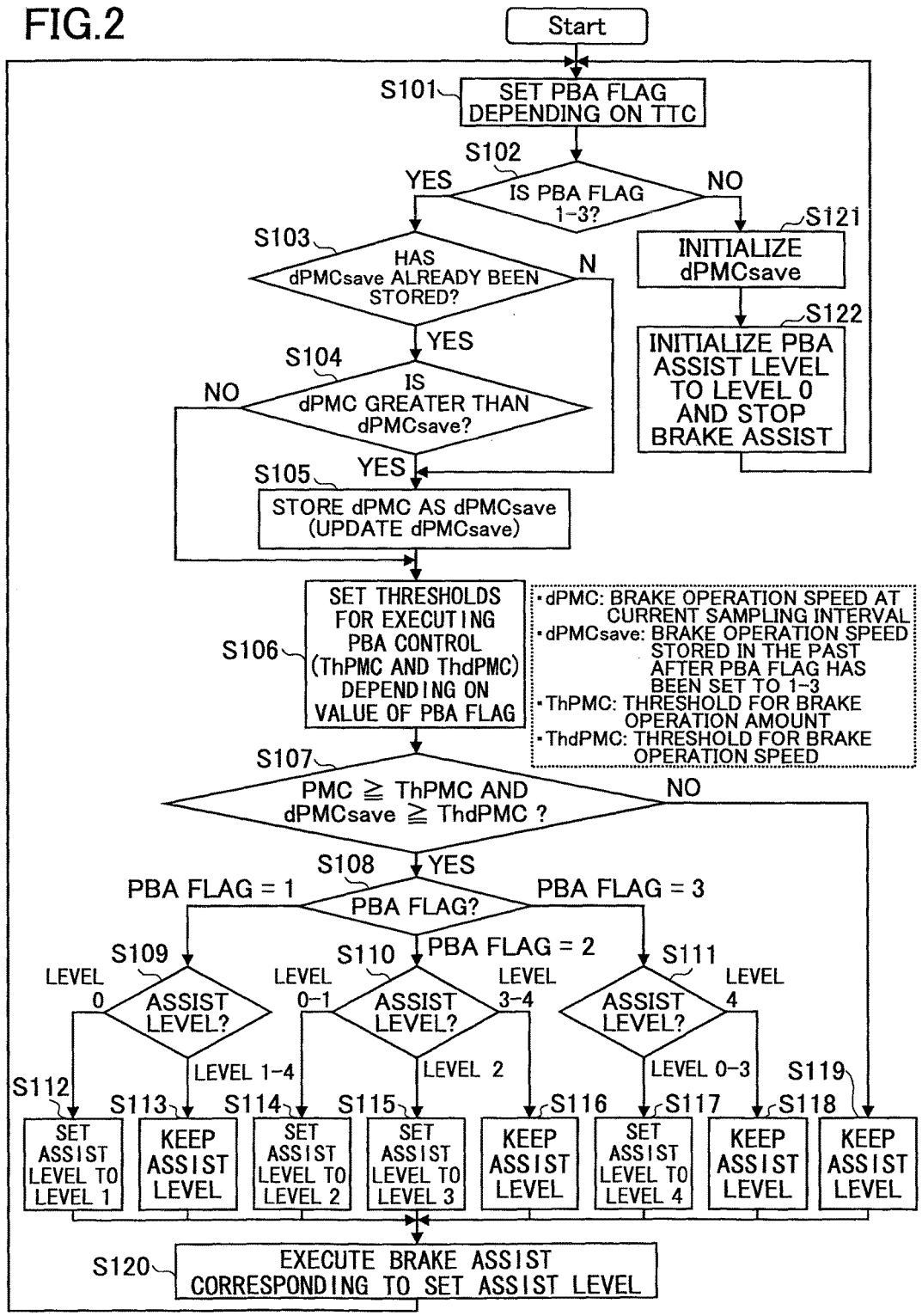
FIG. 2 is a flowchart illustrating operations of a brake apparatus (a PCS ECU and a brake ECU)

FIG. 2 is a flowchart illustrating the operations of the brake apparatus 1 (the PCS ECU 20 and the brake ECU 30). The flowchart may be executed at predetermined sampling times (for example, sampling times of the millimeter-wave radar 10a and the MC pressure sensor 15) during a period after the vehicle that has the brake apparatus 1 built-in has been activated (ignition on) until the vehicle is stopped (ignition off).

First, at Step S101, the PCS ECU 20 sets the PBA flag depending on the TTC calculated based on obstacle information from the obstacle detection unit 10. As described above, for example, it calculates the TTC (=distance/relative speed) from the distance, relative speed, and orientation of the obstacle received from the millimeter-wave radar 10a to set the PBA flag to one of 0 to 3 depending on the calculated value of TTC. Then, the PCS ECU 20 transmits the PBA flag to the brake ECU 30 as a request for a brake assist.

Next, at Step S102, the brake ECU 30 determines whether the PBA flag received from the PCS ECU 20 is within the range of 1 to 3. As described above, the PBA flag 0 may be set as a level in which the likelihood is low for a collision with the obstacle in terms of the relationship with the obstacle (TTC), and a brake assist is not required. At this step, the brake ECU 30 determines whether it is a level where a brake assist is required in terms of the physical relationship with the obstacle. If the PBA flag is within the range of 1 to 3, the process goes forward to Step S103, or if the PBA flag is 0, the process goes forward to Step S121.

Note that if the PBA flag is 0, dPMCsave is initialized (deleted) at Step S121 that has been stored in the RAM of the brake ECU 30 as will be described later. Then, the process goes forward to Step S122 where the level of assist amount for the brake assist is initialized to level 0 (the level in which the brake assist is not executed) to stop the brake assist, and the process goes back to Step S101.

Next, at Steps S103 to S105, the brake ECU 30 stores a brake operation speed as dPMCsave in the storage device such as the internal RAM, based on the MC pressure information from the MC pressure sensor 15. In the present embodiment, if the PBA flag as the collision risk is within the predetermined range, specifically, if the PBA flag is 1 (a collision risk level to start a brake assist by the brake ECU 30), the brake operation speed is stored in the RAM in the brake ECU 30 as dPMCsave. For example, the brake ECU 30 may store the brake operation speed of a first brake operation after the PBA flag has been set to 1. Also, as described above, if the PBA flag has been set to 1, it may store the brake operation speed of a first brake operation after the alarm sound has been indicated to request an output of the alarm sound to the meter ECU (not shown) from the PCS ECU 20. Namely, it may store the brake operation speed at a moment when a brake operation is made by the driver that corresponds to an emergency operation of the brake. This makes it possible to store a brake operation speed in a state where the likelihood becomes higher for a collision with an obstacle, namely, the brake operation speed in an emergency brake operation. Also, if a brake operation speed is detected that is greater than the stored dPMCsave, dPMCsave may be updated with the brake operation speed. This makes it possible to store a maximum value of the brake operation speed during the emergency operation. In the following, a concrete flow will be described.

At Step S103, the brake ECU 30 determines whether the brake operation speed (differential value of the MC pressure) in the past, after the PBA flag has been set to 1-3, has already been stored in the internal RAM as dPMCsave. For example, if it is a first sampling cycle after the PBA flag has been set to 1, dPMCsave has not been stored, or if multiple sampling cycles have already passed after the PBA flag has been set to 1, dPMCsave has been stored.

If dPMCsave exists as the brake operation speed already stored in the past, the process goes forward to Step S104. Or, if dPMCsave does not exist as the brake operation speed already stored in the past, the process goes forward to Step S105 where the brake operation speed (dPMC) in the current sampling cycle is stored as dPMCsave in the RAM.

At Step S104, the brake ECU 30 determines whether the brake operation speed (dPMC) in the current sampling cycle is greater than dPMCsave as the brake operation speed in the past.

If dPMC is greater than dPMCsave, the process goes forward to Step S105 where the brake ECU 30 has the internal RAM store dPMC as dPMCsave. Namely, it updates dPMCsave with the brake operation speed in the current sampling cycle.

If dPMC is less than or equal to dPMCsave, it does not update dPMCsave, and the process goes forward to Step S106.

Next, at Step S106, the brake ECU 30 sets thresholds for executing a brake assist depending on the value of the PBA flag. As will be described later, the brake apparatus 1 in the present embodiment determines whether to execute a brake assist by comparing the brake operation amount that represents an occurrence and the level of the brake operation with a threshold, and comparing the brake operation speed that represents the emergency operation level of the brake with another threshold. At this step, it sets the threshold for the brake operation amount (ThPMC) and the threshold for the brake operation speed (ThdPMC). Concrete setting of thresholds for execution will be described using FIG. 3.

Figure 3:
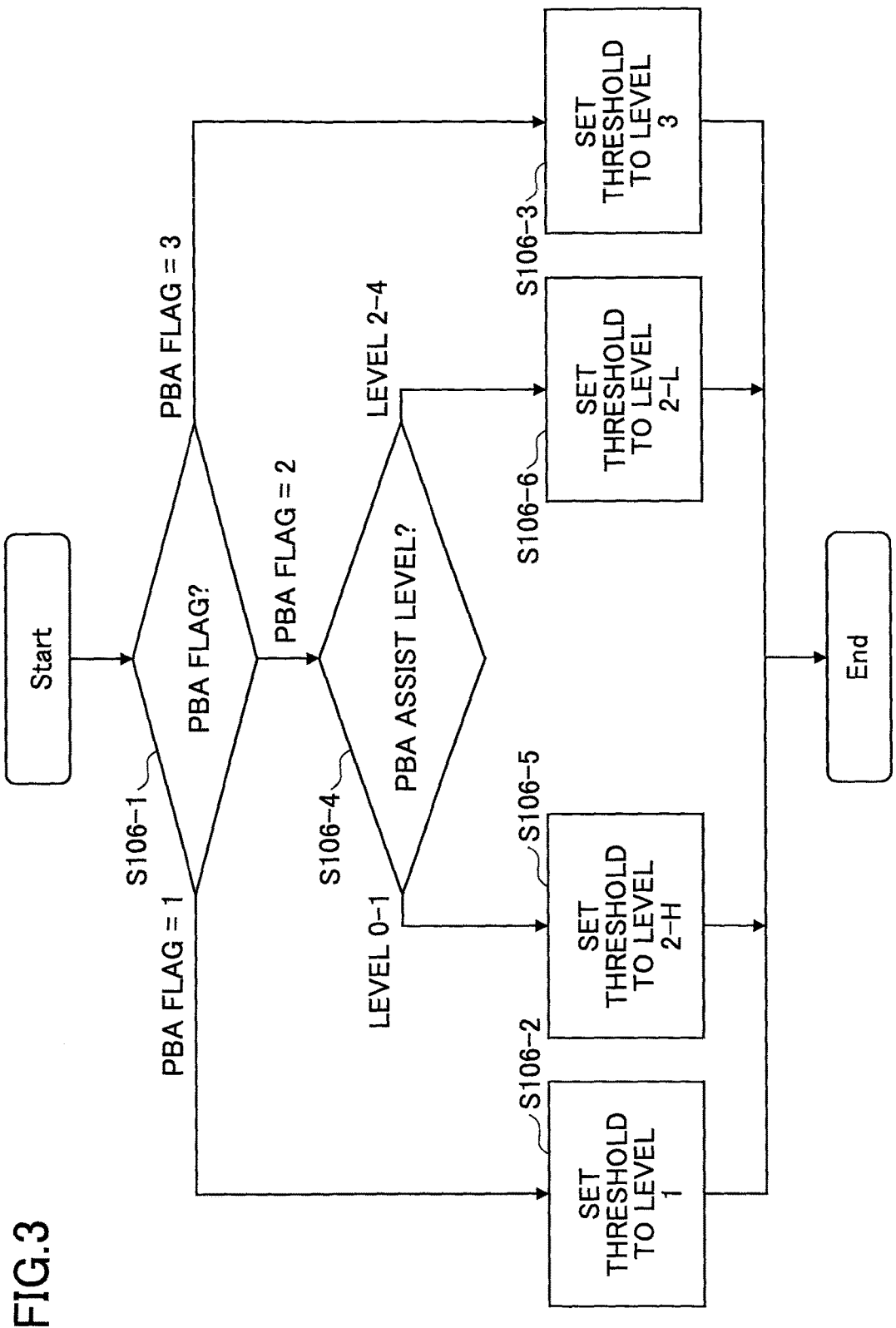
FIG. 3 is a flowchart illustrating a flow of a threshold setting for a brake assist executed by a brake ECU.

FIG. 3 is a flowchart illustrating a flow of threshold setting for a brake assist executed by the brake ECU 30. Note that the thresholds ThPMC and ThdPMC are classified into four levels (level 1, level 2-H, level 2-L, and level 3) beforehand, and are set to one of these levels. Details of the threshold at each level will be described later.

First, at Step S106-1, the brake ECU 30 determines whether the PBA flag is one of 1 to 3.

If the PBA flag is 1, the procedure goes forward to Step S106-2, and it sets the threshold to level 1. Or, if the PBA flag is 3, the procedure goes forward to Step S106-3, and it sets the threshold to level 3.

Or, if the PBA flag is 2, the procedure goes forward to Step S106-4, and it further determines which level of assist amount (assist level) is set for the current brake assist. Note that as will be described later, the assist amount (a brake force added to the brake force generated with an operation by the driver) for a brake assist by the brake apparatus 1 is classified into five levels (level 0 to level 4, including level 0 for the assist amount of 0).

If the current assist level is level 0-1, the procedure goes forward to Step S106-5, and it sets the threshold to level 2-H. Or, if the current assist level is level 2-4, the procedure goes forward to Step S106-6, and it sets the threshold to level 2-L.

Here, the levels of the thresholds ThPMC and ThdPMC and the levels of the assist amount will be described.

FIG. 4 is a schematic view illustrating an example of the thresholds (ThPMC and ThdPMC) and the assist amount for executing a brake assist. FIG. 4 (a) illustrates the levels of the thresholds and concrete values of ThPMC and ThdPMC corresponding to the levels. Also, FIG. 4 (b) illustrates the assist levels and concrete values of the assist amount corresponding to the levels. Note that the values (digits) in the figure are not absolute values of the thresholds ThPMC and ThdPMC and the assist amounts, but they represents ratios between the levels of the thresholds ThPMC and ThdPMC, and the assist amount, respectively. In the following description, the ratios will be used without units.

Referring to FIG. 4 (a), the levels of the thresholds are set with four levels as described above that are level 1, level 2-H, level 2-L, and level 3.

At level 1, the threshold ThPMC for the brake operation amount is 8, and the threshold ThdPMC for the brake operation speed is 4. Also, at level 2-H, the threshold ThPMC for the brake operation amount is 4, and the threshold ThdPMC for the brake operation speed is 2. Also, at level 2-L, the threshold ThPMC for the brake operation amount is 2, and the threshold ThdPMC for the brake operation speed is 1. Also, at level 3, the threshold ThPMC for the brake operation amount is 1, and the threshold ThdPMC for the brake operation speed is 0.

Namely, the threshold for executing a brake assist is lowered from level 1 to level 3. Specifically, the threshold ThPMC for the brake operation amount is lowered from level 1 to level 3 by ratios of 8 (level 1)→4 (level 2-H)→2 (level 2-L)→1 (level 3). Also, the threshold ThdPMC for the brake operation speed is lowered from level 1 to level 3 by ratios of 4 (level 1)→2 (level 2-H)→1 (level 2-L)→0 (level 3). As will be described later, when the brake operation amount and the brake operation speed are greater than or equal to certain thresholds, an execution of a brake assist is started or the assist amount is raised. Therefore, the thresholds ThPMC and ThdPMC as conditions are relaxed from level 1 to level 3. Note that if the PBA flag is 3, the risk of collision with an obstacle is extremely high, and hence, the brake apparatus 1 in the present embodiment executes a brake assist regardless of the emergency operation level (brake operation speed) as long as a brake operation by the driver has been executed to a certain extent. Therefore, the threshold for the brake operation speed ThdPMC is set to 0 for the threshold of level 3 that is set for the PBA flag 3. However, a value greater than or equal to 0 may be set as the threshold for the brake operation speed ThdPMC for the threshold of level 3.

Note that, as described above, while the PBA flag increases from 1 to 3 (the collision risk increases), the level of the threshold changes from level 1 to level 3. Namely, while the collision risk increases, the threshold is lowered to relax the condition for starting the brake assist and raising the assist amount. This makes it possible to appropriately execute a brake assist even if the brake operation amount or the operation speed by the driver is small when the collision risk is high.

Also, referring to FIG. 4 (b), the levels of the assist amount are set with five levels as described above that are level 0 to level 4. Note that level 0 is not shown in the figure that corresponds to the assist amount of 0. The assist amount is raised from level 1 to level 4 by ratios of 1 (level 1)→2 (level 2)→6 (level 3)→10 (level 4).

Note that, as will be described later, when conditions (whether the brake operation amount and the brake operation speed are greater than or equal to the thresholds) are satisfied for executing a brake assist, the assist level (assist amount) is set depending on the PBA flag. Namely, the level is set to level 1 if the PBA flag is 1; level 2 or level 3 if the PBA flag is 2; and level 4 if the PBA flag is 3. Note that as described above, when the PBA flag is 2, the level of the threshold is set to level 2-H or level 2-L depending on the current assist level. Therefore, level 2 or level 3 is set as the assist level corresponding to the level 2-H or level 2-L of the threshold, respectively. Thus, while the PBA flag increases from 1 to 3 (the collision risk increases), the assist amount is raised in a brake assist to appropriately avoid a collision.

Referring to FIG. 3 again, levels of the thresholds ThPMC and ThdPMC are determined in this way at Step S106 in FIG. 2, based on the PBA flag, or the PBA flag and the assist level, as the collision risk.

Referring to FIG. 2 again, next, at Step S107, the brake ECU 30 determines a condition for executing the brake assist, and sets the assist level of the brake assist at Steps S108 to S119 depending on the PBA flag and the current assist level. Note that, in a brake assist according to the present embodiment, not to make the driver feel as if the brake became unresponsive, the assist amount (assist level) is not lowered unless the brake operation by the driver is released (the brake operation amount PMC is 0).

At Step S107, it determines whether the brake operation amount PMC at the current sampling cycle is greater than or equal to the threshold ThPMC, and the brake operation speed dPMCsave in the past stored in the RAM of the brake ECU 30 is greater than or equal to threshold ThdPMC. If the conditions are satisfied, the process goes forward to Step S108.

Or if the conditions are not satisfied, the process goes forward to Step S119, it keeps the current level of the assist amount. Namely, if the level of the assist amount is level 0, it does not continue the brake assist, and lets the driver operate on the brake. Also, if the level of the assist amount is level 1-4, it does not raise the level, and keeps the current level of the assist amount. Note that if the brake operation is released (the brake operation amount is 0 in the current sampling cycle), it sets the level of the assist amount to level 0.

Note that, in the present embodiment, although the brake operation speed of a first brake operation after the PBA flag has been in the range of 1 to 3 is stored as dPMCsave, there are cases where dPMCsave does not exist, for example, if dPMCsave is stored thereafter. In that case, at Step S107, it may compare the brake operation speed dPMC in the current sampling cycle with the threshold ThdPMC.

If the conditions are satisfied at Step S107, it determines at Step S108 whether the PBA flag as the collision risk is 1-3.

At Step S108, if the PBA flag is 1, the procedure goes forward to Step S109, and it further determines which level the current assist level is.

If the current assist level is level 0, the procedure goes forward to Step S112, and it sets the assist level to level 1, namely, it raises the assist level. This makes it possible to appropriately execute the brake assist in accordance with the collision risk (PBA flag).

Also, if the current assist level is level 1-4, the procedure goes forward to Step S113, and it keeps the current level of the assist amount. For example, if the PBA flag has been 1 since before the current sampling cycle, and the assist level has been already raised to level 1, an appropriate brake assist can be continued by keeping the state. Also, if the PBA flag was 2-3 before the current sampling cycle, and the assist level has been already raised to level 2-4, it keeps the current level of the assist amount not to make the driver feel as if the brake became unresponsive as described above.

At Step S108, if the PBA flag is 2, the procedure goes forward to Step S110, and it further determines which level the current assist level is.

If the current assist level is level 0-1, the procedure goes forward to Step S114, it sets the assist level to level 2. Also, if the current assist level is level 2, the procedure goes forward to Step S115, and it sets the assist level to level 3. Namely, if the current assist level is 0-2, it raises the assist level. This makes it possible to appropriately execute the brake assist in accordance with the collision risk (PBA flag).

Also, if the current assist level is 3-4, the procedure goes forward to Step S116, and it keeps the current assist level. For example, if the PBA flag has been 2 since before the current sampling cycle, and the assist level has been already raised to level 3, an appropriate brake assist can be continued by keeping the state. Also, if the PBA flag was 3 before the current sampling cycle, and the assist level has been already increased to level 4, it keeps the current level of the assist amount not to make the driver feel unresponsiveness of the brake as described above.

At Step S108, if the PBA flag is 3, the procedure goes forward to Step S111, and it further determines which level the current assist level is.

If the current assist level is 0-3, the procedure goes forward to Step S117, and it sets the assist level to level 4. Namely, it raises the assist level. This makes it possible to appropriately execute the brake assist in accordance with the collision risk (PBA flag).

Also, if the current assist level is level 4, the procedure goes forward to Step S118, and it keeps the current assist level (level 4). This makes it possible to continue the appropriate brake assist.

Thus, based on the PBA flag as the collision risk, the assist level is determined. Specifically, while the PBA flag increases from 1 to 3 (the collision risk increases), the assist amount is changed from level 1 to level 4. Namely, as described above, while the assist level changes from level 1 to level 4, the assist amount is raised, and hence, while the collision risk gets higher, the assist amount is raised. This makes it possible to appropriately execute the brake assist in accordance with a situation (collision risk) while avoiding excessive intervention to an operation by the driver.

Next, at Step S120, the brake ECU 30 executes the brake assist that corresponds to the assist level set at one of Steps S112 to S119. Specifically, it controls the brake actuator 40 so that the assist amount corresponding to the assist level is added to the brake force generated with the operation of the driver. Then, the process goes back to Step S101.

In this way, the PCS ECU 20 and the brake ECU 30 execute a brake assist to prevent the vehicle from colliding with an obstacle by repeatedly executing the control flow of Steps S101 to S122 described above at predetermined sampling times.

Next, operations of the brake apparatus 1 will be described according to the present embodiment.

The brake apparatus 1 (the brake ECU 30) has the emergency operation level (brake operation speed) (in the current sampling cycle) stored in the RAM in the brake ECU 30 or the like when the collision risk (PBA flag) is within the predetermined range (PBA flag=1). Also, based on the collision risk (PBA flag), it determines the threshold for the emergency operation level (brake operation speed). Then, based on a comparison between the stored emergency operation level (brake operation speed) and the threshold determined as above, it executes a brake assist. This makes it possible to execute an effective brake assist regardless of an appropriate brake operation that may or may not be performed by the driver. Specifically, for example, there may be a case where the brake ECU 30 determines that a brake assist is not required, or is required but at a low assist level when the driver steps on the brake comparatively weakly at a moment when the collision risk is low (PBA flag=1) due to a judgment error or the like. After that, if the collision risk gets higher (PBA flag=2), and the driver performs an additional brake operation, there may be a case where the emergency operation level (brake operation speed) does not reach a value to start a brake assist or to raise the assist level although the situation requires a brake assist to be executed with respect to the relationship with an obstacle. However, in the present embodiment, the brake operation speed is stored as an emergency operation of the brake by the driver at a moment when the low collision risk is low. It is often the case that the brake operation speed at a moment when the collision risk is low (PBA flag=1), which may be a comparatively weak brake operation, is greater than the speed of an additional brake operation on the brake. Therefore, by determining the necessity of a brake assist by comparing the stored brake operation speed with the above threshold, an effective brake assist can be executed in a relationship with the threshold for a high collision risk (PBA flag=2).

More specifically, the brake ECU 30 lowers the threshold for the emergency operation level (brake operation speed)

while the collision risk (PBA flag) gets higher. This makes it possible to execute an effective brake assist when the collision risk is high because it makes the stored emergency operation level (brake operation speed), which is the emergency operation level at a moment when the collision risk is low, tend to go over the threshold.

Also, the brake apparatus 1 (the brake ECU 30) determines the threshold for the operation emergency (brake operation speed) and the threshold for the brake operation amount based on the collision risk (PBA flag) and the assist amount (in the current sampling cycle). Specifically, if the PBA flag is 2, it sets the level of the threshold to level 2-H or level 2-L depending on the assist level in the current sampling cycle is level 0-1 or level 2-4. This makes it possible to provide multiple assist levels in a similar level of the collision risk. Also, providing the multiple assist levels makes it possible to appropriately execute a brake assist in accordance with a situation (collision risk) while avoiding excessive intervention to an operation by the driver.

Also, if the detected emergency operation level (brake operation speed) is higher than the emergency operation level in the past, stored in the RAM in the brake ECU 30, the brake apparatus 1 (the brake ECU 30) updates the stored emergency operation level with a value of the detected emergency operation level. This makes it possible to hold the greatest value of the brake operation speed (emergency operation level) during an emergency operation of the brake by the driver. Therefore, when the collision risk is high (PBA flag=2), the stored emergency operation level (brake operation speed) tends to go over the threshold, which makes it possible to execute an effective brake assist.

The embodiments of the present invention have been described in detail as above. It should be understood that the various changes, substitutions, and alterations could be made hereto without departing from the spirit and scope of the invention.

For example, in the embodiments described above, the brake operation speed of a first brake operation is stored after the PBA flag has been in the range of 1-3. Alternatively, if a brake operation speed is generated that is greater than or equal to a predetermined value (for example, a value greater than or equal to the threshold for the brake operation speed ThdPMC for the threshold of level 2-H) after the PBA flag has been in the range of 1-3, the brake operation speed may be stored as dPMCsave. This makes it possible to execute an effective brake assist when the collision risk gets higher (when the PBA flag is increased from 1 to 2) because the stored emergency operation level (brake operation speed) can go over the threshold. Also, as similarly done in the embodiments described above, dPMCsave may be updated with a maximum value of the brake operation speed.

The present application is based upon and claims the benefit of priority of the prior Japanese Priority Application No. 2013-221446 filed on Oct. 24, 2013, the entire contents of which are hereby incorporated by reference.

DESCRIPTION OF REFERENCE SYMBOLS 1 brake apparatus
10 obstacle detection unit
10a millimeter-wave radar
10b camera
15 MC pressure sensor (detection unit)
20 PCS ECU (collision risk calculation unit)
30 brake ECU (storage unit, threshold determination unit, brake assist unit, and brake assist amount determination unit)
40 brake actuator

The invention claimed is:

1. A brake apparatus configured to execute a brake assist based on a collision risk representing a risk of a vehicle including the brake apparatus to collide with an obstacle, and an emergency operation level representing an emergency level of a brake operation by a driver, comprising:
   a collision risk calculation unit configured to calculate the collision risk;
   a detection unit configured to detect the emergency operation level;
   a storage unit configured to store the emergency operation level detected by the detection unit when the collision risk is within a predetermined range;
   a threshold determination unit configured to determine a threshold for the emergency operation level based on the collision risk; and
   a brake assist unit configured to execute the brake assist based on a comparison between (1) the emergency operation level stored by the storage unit at a moment the collision risk was a first value and (2) the threshold for the emergency operation level determined by the threshold determination unit at a moment the collision risk is a second value, wherein
   the collision risk becomes the second value after having been the first value, and
   the second value is greater than the first value.

2. The brake apparatus as claimed in claim 1, wherein the storage unit stores the emergency operation level detected by the detection unit at a predetermined moment after the collision risk has reached a value greater than or equal to a predetermined value.

3. The brake apparatus as claimed in claim 1, wherein the threshold determination unit decreases the threshold for the emergency operation level as the collision risk increases.

4. The brake apparatus as claimed in claim 1,
   wherein the detection unit detects a brake operation amount by the driver,
   wherein the threshold determination unit determines a threshold for the brake operation amount based on the collision risk, and
   wherein the brake assist unit executes the brake assist when the emergency operation level stored by the storage unit is greater than or equal to the threshold for the emergency operation level and the brake operation amount is greater than or equal to the threshold for the brake operation amount.

5. The brake apparatus as claimed in claim 4, further comprising:
   a brake assist amount determination unit configured to determine a brake assist amount based on the collision risk,
   wherein the threshold determination unit determines the threshold for the emergency operation level and the threshold for the brake operation amount based on the collision risk and the brake assist amount.

6. The brake apparatus as claimed in claim 1, wherein the storage unit updates the stored emergency operation level with the emergency operation level detected by the detection unit when the emergency operation level detected by the detection unit is higher than the stored emergency operation level.

7. The brake apparatus as claimed in claim 1, wherein the emergency operation level is an operation speed of the brake operation by the driver.

8. A brake apparatus configured to execute a brake assist based on a collision risk representing a risk of a vehicle including the brake apparatus to collide with an obstacle, and an emergency operation level representing an emergency level of a brake operation by a driver, comprising:
  a sensor configured to detect the emergency operation level; and
  circuitry configured to:
  calculate the collision risk;
  store the detected emergency operation level when the collision risk is within a predetermined range;
  determine a threshold for the emergency operation level based on the collision risk; and
  execute the brake assist based on a comparison between (1) the emergency operation level stored at a moment the collision risk was a first value and (2) the threshold for the emergency operation level determined at a moment the collision risk is a second value, wherein
  the collision risk becomes the second value after having been the first value, and
  the second value is greater than the first value.

9. The brake apparatus as claimed in claim 8, wherein the circuitry is configured to store the detected emergency operation level at a predetermined moment after the collision risk has reached a value greater than or equal to a predetermined value.

10. The brake apparatus as claimed in claim 8, wherein the threshold for the emergency operation level decreases as the collision risk increases.

11. The brake apparatus as claimed in claim 8, wherein
  the sensor is configured to detect a brake operation amount by the driver, and
  the circuitry is configured to:
  determine a threshold for the brake operation amount based on the collision risk; and
  execute the brake assist when the stored emergency operation level is greater than or equal to the threshold for the emergency operation level and the brake operation amount is greater than or equal to the threshold for the brake operation amount.

12. The brake apparatus as claimed in claim 11, wherein the circuitry is configured to:
  determine a brake assist amount based on the collision risk,
  determine the threshold for the emergency operation level and the threshold for the brake operation amount based on the collision risk and the brake assist amount.

13. The brake apparatus as claimed in claim 8, wherein the circuitry is configured to update the stored emergency operation level with the detected emergency operation level when the detected emergency operation level is higher than the stored emergency operation level.

14. The brake apparatus as claimed in claim 8, wherein the emergency operation level is an operation speed of the brake operation by the driver.

* * * * *